(12) United States Patent
Rodoni

(10) Patent No.: US 10,204,324 B2
(45) Date of Patent: Feb. 12, 2019

(54) WASTE MANAGEMENT SYSTEM HAVING AUTOMATED WASTE TRACKING

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 0 days.

(21) Appl. No.: 15/294,332

(22) Filed: Oct. 14, 2016

(65) Prior Publication Data

US 2017/0116583 A1   Apr. 27, 2017

Related U.S. Application Data

(60) Provisional application No. 62/246,442, filed on Oct. 26, 2015, provisional application No. 62/306,567, filed on Mar. 10, 2016.

(51) Int. Cl.
| | |
|---|---|
| *G06Q 30/04* | (2012.01) |
| *G06Q 10/00* | (2012.01) |
| *G06Q 40/00* | (2012.01) |
| *G01G 19/02* | (2006.01) |
| *G06K 9/32* | (2006.01) |
| *G06K 9/62* | (2006.01) |

(52) U.S. Cl.
CPC ............ *G06Q 10/30* (2013.01); *G06Q 30/04* (2013.01); *G06Q 40/10* (2013.01); *G06Q 40/12* (2013.12); *G01G 19/02* (2013.01); *G06K 9/325* (2013.01); *G06K 9/6202* (2013.01); *Y02W 90/20* (2015.05)

(58) Field of Classification Search
CPC ......... G06Q 40/10; G06Q 40/12; G06Q 30/04
USPC ............................................. 705/30, 34, 40
See application file for complete search history.

(56) References Cited

U.S. PATENT DOCUMENTS

| | | | | |
|---|---|---|---|---|
| 5,326,939 | A * | 7/1994 | Schafer | G06K 19/041 177/139 |
| 5,837,945 | A | 11/1998 | Cornwell et al. | |
| 7,213,510 | B1 * | 5/2007 | Bagwell | B30B 9/3021 100/100 |
| 2004/0167799 | A1 | 8/2004 | Berry | |
| 2005/0261917 | A1 | 11/2005 | Forget Shield | |

(Continued)

OTHER PUBLICATIONS

PCT International Search Report, International Application No. PCT/US16/56973, 3 pages.

*Primary Examiner* — Florian M Zeender
*Assistant Examiner* — Christopher R Buchanan
(74) *Attorney, Agent, or Firm* — Rock IP, PLLC

(57) ABSTRACT

A system is disclosed for managing an offloading service performed by a service vehicle at a disposal site. The system may have an identity detection device configured to generate an identity signal associated with the service vehicle at the disposal site, a scale configured to generate a weight signal indicative of an amount of waste material disposed of by the service vehicle at the disposal site during the offloading service, and at least one processing unit in communication with the identity detection device and the scale. The at least one processing unit may be configured to correlate the weight signal to a customer for which the service vehicle previously performed an onloading service based on the identity signal, and automatically generate an invoice for the customer for the onloading service and for the offloading service.

20 Claims, 3 Drawing Sheets

(56) References Cited

U.S. PATENT DOCUMENTS

| | | | |
|---|---|---|---|
| 2008/0010197 A1* | 1/2008 | Scherer | G06Q 20/102 |
| | | | 705/40 |
| 2008/0041948 A1* | 2/2008 | Mayers | G06Q 10/08 |
| | | | 235/385 |
| 2011/0116899 A1 | 5/2011 | Dickens | |
| 2013/0024335 A1* | 1/2013 | Lok | G06Q 20/14 |
| | | | 705/34 |
| 2014/0172658 A1* | 6/2014 | Cho | G06Q 20/145 |
| | | | 705/34 |
| 2014/0239059 A1 | 8/2014 | Flood et al. | |

* cited by examiner

WASTE MANAGEMENT SYSTEM HAVING AUTOMATED WASTE TRACKING

RELATED APPLICATIONS

This application is based on and claims priority to U.S. Provisional Application Nos. 62/246,442 filed on Oct. 26, 2015; and 62/306,567 filed on Mar. 10, 2016, the contents of all of which are expressly incorporated herein by reference.

TECHNICAL FIELD

The present disclosure relates generally to a management system and, more particularly, to a waste management system having automated waste tracking.

Commercial and residential waste service providers (e.g., waste haulers and/or waste management companies) typically utilize service vehicles to collect waste from customer properties and to dispose of the waste at a disposal site (e.g., recycling center, a sorting facility, a transfer station, and/or a landfill). Compensation for some waste services is based on the amount and/or type of waste collected from a customer property and how much of the waste is disposed of at a particular disposal site.

Current methods of accounting for the amount of waste collected and disposed of rely on human input. For example, upon arriving at a disposal site, a full-weight of the service vehicle may be measured on a scale, and an employee may log the data in a ledger and deliver the measured weight (e.g., via a paper receipt) to an operator of the service vehicle. After disposing of the waste, the service vehicle may return for an empty-weight measurement, and a net change in weight may be calculated by the employee so that the empty- and net-weights can be logged and again delivered to the service vehicle operator. The service vehicle operator may then pay an associated disposal fee, and thereafter manually generate a service invoice for the customer. In some situations, the disposal site may generate and send an invoice to the service vehicle operator and/or the customer based on the logged information. While human input in the waste disposal process may be suitable for some situations, it may also be susceptible to error and a decrease in efficiency.

The disclosed system is directed to overcoming one or more of the problems set forth above and/or other problems of the prior art.

SUMMARY

In one aspect, the present disclosure is directed to a system for managing an offloading service performed by a service vehicle at a disposal site. The system may include an identity detection device configured to generate an identity signal associated with the service vehicle at the disposal site, a scale configured to generate a weight signal indicative of an amount of waste material disposed of by the service vehicle at the disposal site during the offloading service, and at least one processing unit in communication with the identity detection device and the scale. The at least one processing unit may be configured to correlate the weight signal to a customer for which the service vehicle previously performed an onloading service based on the identity signal, and automatically generate an invoice for the customer for the onloading service and for the offloading service.

In another aspect, the present disclosure is directed to a method for managing an offloading service performed by a service vehicle at a disposal site. The method may include generating an identity signal associated with the service vehicle at the disposal site, and generating a weight signal indicative of an amount of waste material disposed of by the service vehicle at the disposal site during the offloading service. The method may further include correlating the weight signal to a customer for which the service vehicle previously performed an onloading service based on the identity signal, and automatically generating an invoice for the customer for the onloading service and for the offloading service.

In yet another aspect, the present disclosure is directed to a non-transitory computer readable medium containing computer-executable programming instructions for performing a method of managing an offloading service performed by a service vehicle at a disposal site. The method may include generating a service signal indicative of an onloading service performed by the service vehicle, generating an identity signal associated with the service vehicle at the disposal site, generating a location signal indicative of a location of the service vehicle during the onloading service, and generating a weight signal indicative of an amount of waste material disposed of by the service vehicle at the disposal site during the offloading service. The method may also include correlating the weight signal to a customer for which the service vehicle performed the onloading service based on the identity signal, the service signal, and the location signal; automatically generating an invoice for the customer for the onloading service and for the offloading service; automatically generating payment to the disposal site based on the identity signal and the weight signal; automatically generating payment to a service provider responsible for the service vehicle based on the identity signal, the weight signal, and correlating of the weight signal to the customer; and automatically updating an account record of at least one of the customer and the service provider based on the identity signal, the weight signal, the service signal, the location signal, and correlating of the weight signal to the customer.

DETAILED DESCRIPTION

Figure 1:
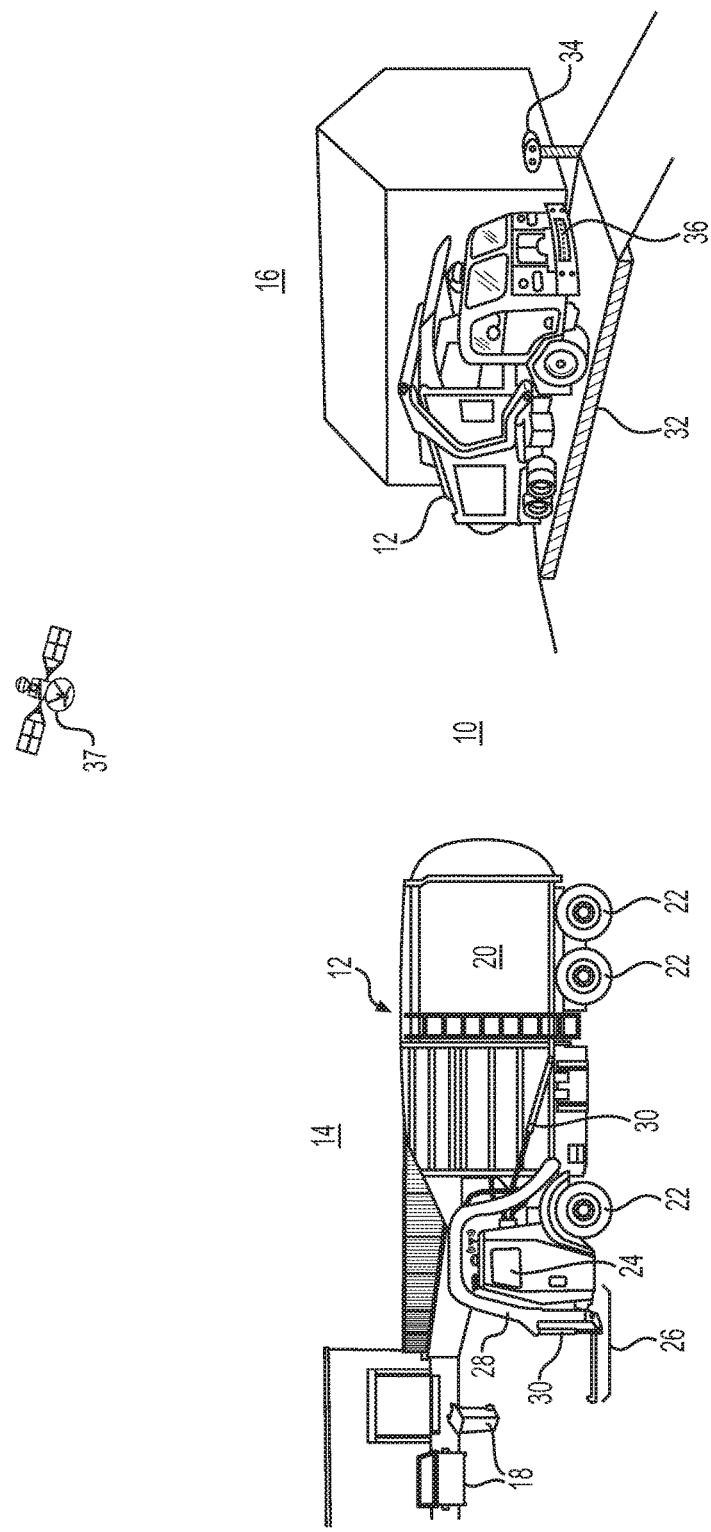
FIG. 1 is an isometric illustration of an exemplary disclosed waste management environment.

FIG. 1 illustrates an exemplary waste management environment, ("environment") 10, at which one or more service vehicles 12 are providing waste services. Environment 10 may include a service location 14 and a disposal site 16. Service location 14 may include, for example, a commercial location (e.g., a store, a factory, a government building) and/or a residential location having one or more receptacles 18 that require periodic services of vehicle 12. The services may include, among other things, the removal of waste materials from inside of receptacle(s) 18 and/or the removal of receptacle(s) 18 themselves, which may have waste materials contained therein. In some situations, the services may involve collection of waste materials that have not been deposited in a receptacle 18. Disposal site 16 may include, for example, a recycling center, a sorting facility, a transfer station, and/or a landfill at which the previously collected waste materials are disposed of.

Service vehicle 12 may take many different forms. In the examples shown in FIG. 1, service vehicle 12 is a hydraulically actuated, front-loading type of service vehicle. Specifically, service vehicle 12 may include a bed 20 supported by a plurality of wheels 22, a cab 24 located forward of bed 20, and a lifting device 26 extending forward of cab 24. Lifting device 26 may consist of, among other things, one or more lift arms 28 configured to engage and/or grasp receptacle 18, and one or more actuators 30 powered by pressurized oil to raise and tilt lift arms 28 (and receptacle 18) up past cab 24 to a dump location over bed 20. After dumping of receptacle 18, pressurized oil may be released from hydraulic actuator(s) 30 to allow lowering of lift arms 28 and receptacle 18 back to the ground in front of service vehicle 12. In other examples, lifting device 26 may be located to pick up receptacles 18 from a side and/or a rear of service vehicle 12. It is also contemplated that receptacles 18 may be manually lifted and dumped into bed 20 or simply loaded onto bed 20 for transportation away from service location 14. Other configurations may also be possible.

After emptying of receptacle 18 into vehicle 12 or loading of receptacle 18 onto vehicle 12, vehicle 12 may travel to disposal site 16 for emptying of vehicle 12 and/or receptacle 18 (or for swapping a full receptacle 18 for an empty receptacle 18). For the purposes of this disclosure, the emptying of receptacle 18 into vehicle 12 and/or the loading of receptacle 18 onto vehicle 12 may be considered an onloading service, while the emptying of vehicle 12 and/or the removal of receptacle 18 at disposal site 16 may be considered an offloading service. In some embodiments, one or more characteristics of vehicle 12, receptacle 18, and/or the waste materials contained therein may be detected during onloading, travel between service location 14 and disposal site 16, and/or offloading. For example vehicle 12 may pass over a scale 32 as it enters and/or exits disposal site 16, such that a full weight, empty weight, and/or net weight may be detected by scale 32. In addition, an identity of vehicle 12, the operator of vehicle 12, receptacle 18, and/or the waste carried by vehicle 12 may be detected as vehicle 12 onloads waste materials; enters and/or exists disposal site 16, and/or offloads waste materials at disposal site 16. This identity may be detected by way of an identity detection device 34.

Scale 32 may be configured to generate one or more weight signals associated with vehicle 12, receptacle 18, and/or the waste contained therein. In one embodiment, scale 32 may generate the weight signal(s) as vehicle 12 rolls over or stops on top of scale 32. In another embodiment, scale 32 may generate multiple weight signals, each associated with a weight, of a different axle of vehicle 12. In this embodiment, the different signals maybe combined to determine a total weight of vehicle 12. Other embodiments (e.g., embodiments using individual wheel scales) may also be possible.

Identity detection device 34 may take many different forms, each configured to generate one or more signals indicative of an identity of vehicle 12 (a.k.a., identity signals), of receptacle 18, of the operator of vehicle 12, and/or of the waste contained within vehicle 12 and/or receptacle 18. In the disclosed embodiment, identity detection device 34 is an optical device, for example a camera, configured to capture an image of a particular area of vehicle 12, receptacle 18, the operator, and/or the waste. For example, an image of a license plate 36 or other identification means (e.g., barcode, QR code, serial number, etc. that is affixed to vehicle 12 and/or receptacle 18) may be captured as vehicle 12 approaches disposal site 16, enters disposal site 16, rolls over scale 32, leaves disposal site 16, etc. As will be explained in more detail below, this image may then be compared to images of other vehicles 12, receptacles 18, operators, waste materials, etc. stored within an associated database to confirm identity of vehicle 12, receptacle 18, the operator, and/or the waste materials. It is contemplated that identity detection device 34 could alternatively take another form (e.g., a barcode reader, an RFID tag reader, an NFC reader, a facial recognition device, a finger print reader, etc.), if desired. Multiple different identity detection devices 34 may be simultaneously utilized, in some instances.

As each service vehicle 12 moves about environment 10, a satellite 37 or other tracking device may communicate with an onboard locating device 38 (shown only in FIG. 2) to monitor the movements of service vehicle 12 and the associated changes made to environment 10 (e.g., during onloading, travel, offloading, etc.). As will be explained in more detail below with reference to FIG. 2, an onboard controller 40, a disposal site controller 42, and/or a separate server (e.g., a server 44 located at a back office or other service facility), may then manage future operations of service vehicle 12 (and other similar service vehicles 12) based on these movements and changes.

Locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 37 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. Based on the signals generated by locating device 38 and based on known kinematics of service vehicle 12, the position, heading, travel speed, acceleration, and orientation of service vehicle 12 may be determined. This information may then be used to selectively correlate the waste materials picked up by service vehicle 12 as having been retrieved from a particular customer, at a particular service location 14, by a particular operator, via a particular service vehicle 12, on a particular day, at a particular time.

Onboard controller 40, disposal site controller 42, and offboard server 44 may each include means for monitoring, recording, storing, indexing, processing, communicating, and/or controlling other onboard and/or offboard devices. These means may include, for example, a memory, one or more data storage devices, a processing unit, or any other components that, may be used to run the disclosed application. Furthermore, although aspects of the present disclosure may be described generally as being stored in memory, one skilled in the art will appreciate that these aspects can be stored on or read from different, types of computer program products or computer-readable media such as computer chips and secondary storage devices, including hard disks, floppy disks, optical media, CD-ROM, or other forms of RAM or ROM.

Figure 2:
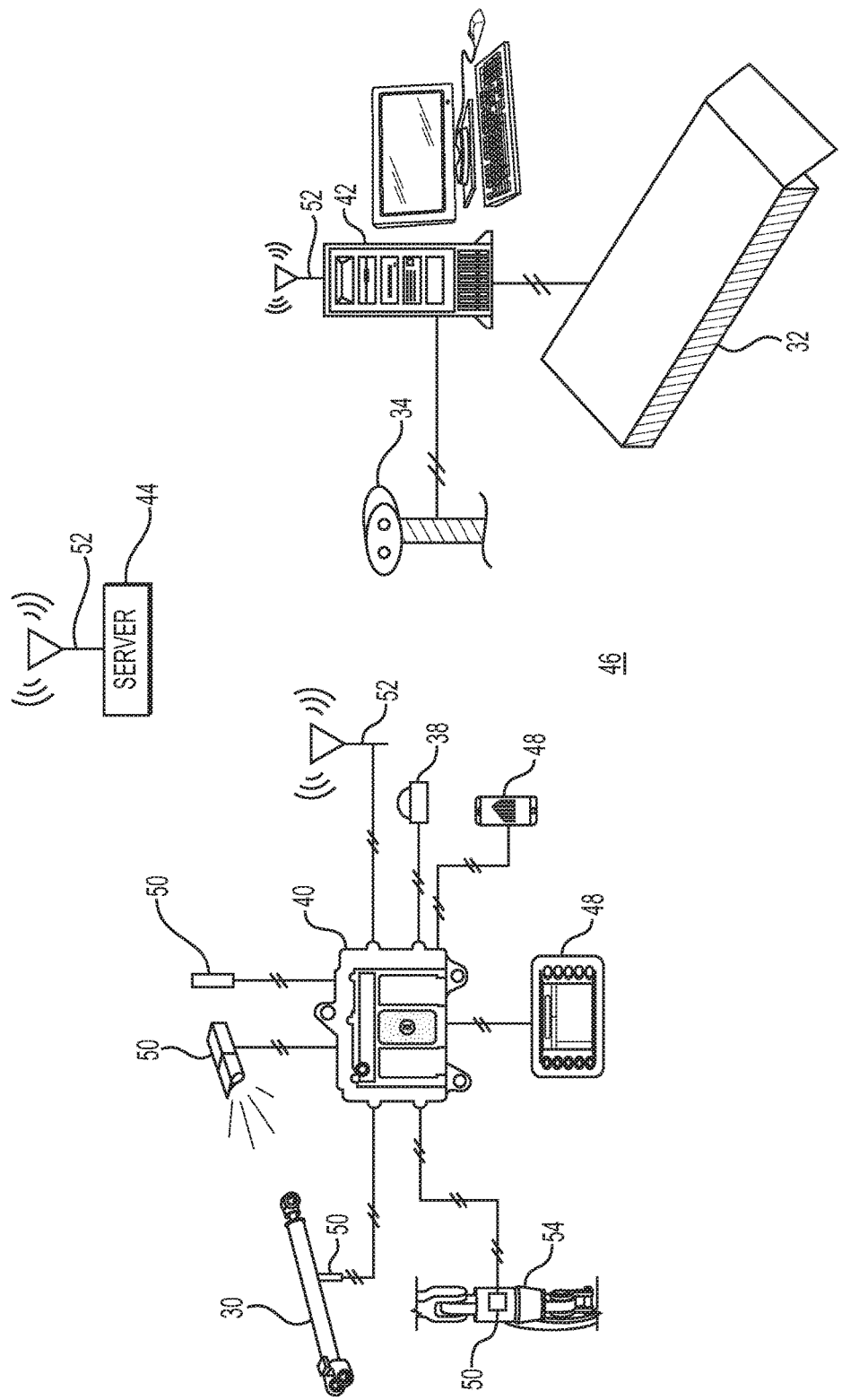
FIG. 2 is a diagrammatic illustration of an exemplary disclosed system that may be used to manage the environment of FIG. 1.

As shown in FIG. 2, onboard controller 40, disposal site controller 42, and offboard server 44 may each form a portion of a waste management system ("system") 46, which is configured to track, assist, and/or control movements of service vehicle(s) 12 (shown only in FIG. 1). In addition to these control devices, system 46 may also include scale 32, identity detection device 34, and locating device 38, as well as at least one of a manual input device 48 and a sensor 50 mounted or otherwise located onboard each service vehicle 12. In some embodiments, system 46 includes both manual input device 48 and one or more sensors 50. In other embodiments, sensor 50 (and/or onboard controller 40) may be internal to manual input device 48. Onboard controller 40 may be in communication with the other onboard components and/or with disposal site controller 42 (e.g., directly, or indirectly via server 44) by way of a communication device 52.

Manual input device 48 may provide a way for an operator of service vehicle 12 to input information regarding observances made while traveling around environment 10. For example, the operator may be able to enter a type, amount, and/or condition of waste observed at a particular location (e.g., in or around a particular receptacle 18), a condition of receptacle 18, a location of receptacle 18, and or other information about the receptacle and waste engaged by, loaded into, or otherwise processed by service vehicle 12. The information may be input, in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 48, if desired. In addition to receiving manual input from an operator, input device 48 may also be capable of displaying information, for example an electronic map of environment 10, instructions from server 44, disposal information (e.g., pay load information, such as the weight signal) from disposal site controller 42, scheduling, receptacle information (e.g., ID, configuration, location, weight, etc.), questions, etc.

In some embodiments, input device 48 may be configured to execute an application. For example, when input device 48 is a mobile device (for example a smartphone), the application can be a mobile app ("app"). The app can provide a graphical user interface (GUI) that displays information about a waste handling operation to an operator of service vehicle 12; and that receives input from the operator used to transmit operational data to onboard controller 40, disposal site controller 42, and/or server 44, to receive and display information about a current operation (e.g., as monitored by sensor(s) 42), etc.

Sensors 50 may be any type of sensing and/or transducing device configured to monitor parameters associated with waste materials loaded into service vehicle 12 and/or the associated receptacles 18 being moved by service vehicle 12), and to generate corresponding signals indicative thereof. Each of these sensors 50 may be any type of device known in the art, and located anywhere on or in service vehicle 12. In one example, sensor 50 may embody a lift sensor, such as any one or more of a load cell, a force gauge, a pressure sensor, a motion sensor, an acoustic sensor, a camera, or another type of lift sensor associated directly with lift arms 28, with actuator(s) 30, with receptacle 18, with bed 20, and/or with a strut 54 supporting bed 20. In this example, the signals generated by sensor(s) 50 may correspond with strain on lift arms 28, with a force applied to lift arms 28 by actuator(s) 30, with a payload weight of bed 20, with a motion of receptacle(s) 18, with a sound of lift arm and/or receptacle movement, with an amount and/or type of waste contained inside receptacle 18, etc.

Signals generated by sensors 50 may be communicated to onboard controller 40, disposal site controller 42, and/or server 44, and the corresponding processing unit(s) may use the signals to determine conditions surrounding receptacle(s) 18 (and/or the waste inside receptacle(s) 18) before, during, and/or after onloading, travel, and offloading by service vehicle 12. As described above, any one or more of sensors(s) 50 may form an integral portion of input device 48 (e.g., the smartphone or tablet carried by the operator) or be a standalone component in wired or wireless communication with the other components, as desired.

Onboard controller 40 may be configured to manage communications between other onboard components and server 44. For example, onboard controller 40 may receive signals from locating device 38, input device(s) 48, and sensor(s) 50, and correlate the signals, filter the signals, buffer the signals, record the signals, or otherwise condition the signals before directing the signals offboard via communication device 52.

Similarly, disposal site controller 42 may be configured to manage communications between other disposal site components and server 44. For example, disposal site controller 42 may receive signals from scale 32 and/or identity detection device 34, and correlate the signals, filter the signals, buffer the signals, record the signals, or otherwise condition the signals before directing the signals offboard via communication device 52.

Communication device(s) 44 may be configured to facilitate communication between onboard controller 40, disposal controller 42, and server 44. Communication device(s) 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 40 and/or disposal site controller 42 may be omitted, and server 44 may communicate directly with scale 32, identity detection device 34, locating device 38, input device(s) 48, and/or sensor(s) 50 via communication device(s) 44, if desired. Other means of communication may also be possible.

Server 44 (and/or onboard and/or disposal site controllers 40, 42), based on the information received from onboard service vehicles 12 and also based on information received from disposal site 16, can be configured to execute instructions stored on computer readable medium to perform methods of waste management at environment 10. For example, server 44 may be configured to monitor when service vehicle 12 is nearing a service location (e.g., based on the known address and signals from locating device 38), when service vehicle 12 has stopped, when service vehicle 12 is servicing receptacle 18 and onloading waste materials, how much and/or what type of waste materials service vehicle 12 has onloaded, when service vehicle 12 is filled with waste material to a maximum capacity, when service vehicle 12 has entered disposal site 16, how much and/or what type of waste material is offloaded at disposal site 16, etc. This data recording during monitoring may then be used to determine business costs and efficiencies, determine invoicing and payments, determine service opportunities, etc. An exemplary process 300 is illustrated in FIG. 3 that may be completed by the processing unit(s) of any one or more of onboard controller 40, disposal site controller 42 and server 44, and will be explained in more detail in the following section to further illustrate the disclosed concepts.

INDUSTRIAL APPLICABILITY

The disclosed system may be applicable to the waste service industry, where service monitoring can affect profitability and efficiency. The disclosed system may be able to automatically monitor operations of a service vehicle 12, and to detect completion of an assigned waste service in a manner desired by a customer. The disclosed system may then provide tracking information, along with automated invoicing and paying. Operation of system 46 will now be described with reference to process 300 illustrated in FIG. 3.

Figure 3:
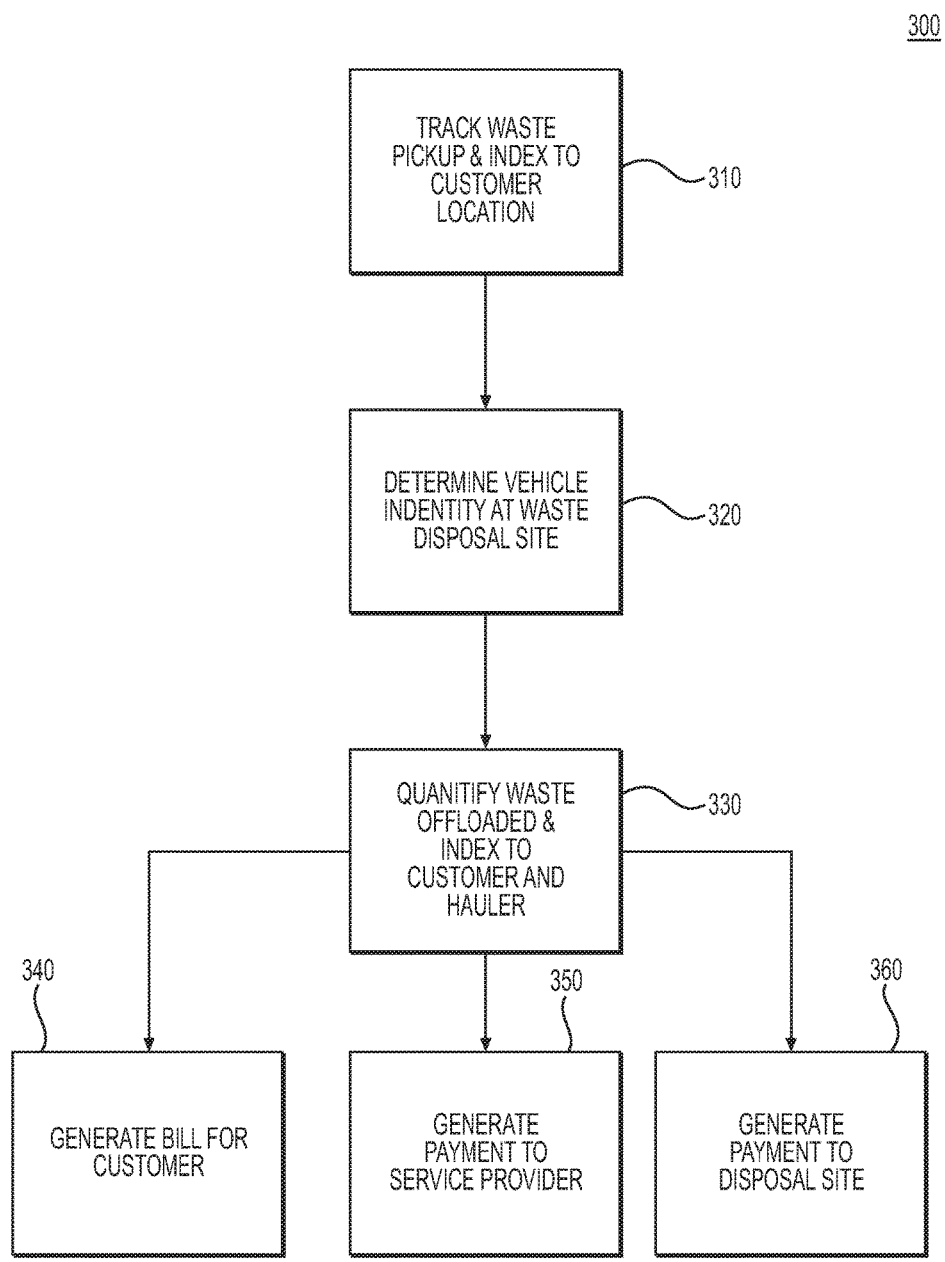
FIG. 3 is a flowchart depicting an exemplary disclosed method that may be performed by the system of FIG. 2.

As shown in FIG. 3, process 300 may begin with the tracking of an onloading service (e.g., emptying of receptacle 18 into bed 20 and/or loading of receptacle 18 onto service vehicle 12) performed by service vehicle 12, and correlating of the onloading service to a particular customer and/or service location 14 (Step 310). In particular, the operator of service vehicle 12 may follow an assigned route and perform assigned onloading services at one or more service locations 14 following an assigned order. Travel of service vehicle 12 toward each service location 14 and/or operation at each service location 14 may be monitored. For example, the position, orientation, and/or speed of service vehicle 12 may be tracked by way of locating device 38, and the lifting, tilting, dumping, weight, etc. of particular (e.g., detected and/or recognized) receptacles 18 at service location 14 maybe tracked by way of sensor(s) 50. Thereafter, the position, orientation, and/or speed of service vehicle 12 may be tracked during travel to disposal site 16, and the lifting, tilting, dumping, etc. of receptacles 18 (i.e., the offloading of waste materials) at disposal site 16 maybe again tracked by way of sensor(s) 50.

In some embodiments, the information tracked during travel of service vehicle 12 along the assigned route and/or during onloading services performed at service location 14 may be compared to expected information to determine if an error has been made. For example, the tracked location of service vehicle 12 and/or time of service may be compared to an expected service location 14 and/or schedule to ensure that service is being performed at the right location and at the right time. Likewise, the identity (e.g., a size, shape, type, serial number, color code, etc.) of the receptacle 18 being serviced may be compared to an expected identity to ensure that the right receptacle 18 is being serviced. In some instances, the type (e.g., recycling, compostable, general waste, etc.) and/or weight of material inside of receptacle 18 (e.g., as viewed and input by the operator and/or captured by one or more of sensors 50) may be compared to an expected type and/or weight of material to ensure that the right material is being disposed of. In these embodiments, if a discrepancy is found, the operator of service vehicle 12, the customer associated with service location 14, and/or any of onboard controller 40, disposal site controller 42, and server 44 may be alerted. For example, a notification may be generated by onboard controller 40 and caused to display on input device 48 indicating that the operator is at the wrong location, has picked up the wrong receptacle, and/or that the wrong material is in the picked-up receptacle. The operator may then be provided with instructions regarding how to proceed.

Service vehicle 12 may be assigned a particular disposal site 16 based on the type and/or amount of material retrieved during execution of its daily route. For example, depending on whether service vehicle 12 has retrieved primarily recycling material, compostable material, general waste, etc.; depending on its proximity to a particular disposal site; depending on how much (volume and/or weight) waste has been onloaded; and/or depending on specific capabilities, costs, and/or regulations of available disposal sites 16; service vehicle 12 may be assigned to travel to a particular recycling center, sorting facility, transfer station, landfill, or other site for offloading.

As service vehicle 12 nears and/or enters disposal site 16, an identity associated with service vehicle 12 (e.g., the identity of service vehicle 12 itself, the identity of receptacles 18 being carried by service vehicle 12, the identity of the vehicle operator, and/or another similar identity) may be determined (Step 320). The identity may be determined by disposal site controller 42 and/or server 44 based on information provided by identity detection device 34. For example, an image of license plate 36 captured by identity detection device 34 may be compared to images of the license plates of all service vehicles 12 stored in memory. When the comparison shows a match between license plate 36 and a stored license plate, the identity of the vehicle corresponding with the stored license plate may be determined to be the identity of service vehicle 12. Similar comparisons may be made based on a broadcast VIN number, a detected RFID tag, information from an NFC device, a fingerprint scan collected from the operator, a scanned facial image, etc.

Before, during, and/or after identity confirmation, an amount of waste offloaded at disposal site 16 may be quantified and correlated to the identity determined at step 320 and/or to the customer location tracked at step 310 (Step 330). The amount of waste offloaded at disposal site 16 may be quantified via scale 32. In particular, service vehicle 12 may be weighed during entry to disposal site 16, at a time when service vehicle 12 is full with waste materials, and again as service vehicle 12 leaves disposal site 16 in an emptier state after offloading. The net weight of service vehicle 12 may then be determined as a difference between the full and emptier weights. In some embodiments, a type of material offloaded from service vehicle 12 may also be determined, for example based on the tracked position of service vehicle 12 at disposal site 16 during offloading, based on the particular disposal site 16 at which the waste material is offloaded, and/or based on information (e.g., operator observances) tracked during onloading of the waste material. The type and/or amount of offloaded waste may then be correlated to the determined identity of service vehicle 12 and/or the identity of the operator. In addition, based on the previous tracked operations of service vehicle 12 during a collection time before service vehicle 12 arrived at disposal site 16 (e.g., based the travel route of service vehicle 12 between disposal site visits and the associated onloading service operations), the offloaded material may be further correlated to a particular service location 14, to a particular receptacle 18, and/or to a particular customer associated with service location 14 and/or receptacle 18.

Based on the amount and/or type of waste material offloaded by a particular service vehicle 12 (and/or operator) and also based on a known service location 14 (and corresponding customer correlated to that location) from where the waste material was previously collected, system 46 may be configured to automatically respond in several different ways. For example, system 46 (e.g., onboard controller 40, disposal site controller 42, and/or server 44) may be configured to generate a corresponding invoice for the customer for the onloading service performed by service vehicle 12 at the customer's service location 14 and/or for the offloading service performed at disposal site 16 (Step 340), generate payment to the service provider responsible for the operations performed by the particular service vehicle 12 (Step 350), and/or generate payment to disposal site 16 for taking the offloaded material (Step 360). The invoice and/or payments may be electronically generated and directed (e.g., via email) to the corresponding party, printed and mailed to corresponding party, or otherwise delivered in electronic and/or paper form to the corresponding party. Account records for the customer, the service provider, and/or the disposal, site 16 may also be completed at steps 340, 350, and 360, respectively.

The disclosed system may provide tools, which can be used to monitor, invoice for, and pay for performance of waste services. By detecting when waste services have occurred, quantifying the waste services, and correlating the waste services to particular customers, particular locations, particular service vehicles, and/or particular operators, the disclosed system may allow for efficient management of associated duties (e.g., invoicing, scheduling, payments, etc.). These things may result in greater profitability for the service provider and record accuracy for both the provider and the customer.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing an offloading service, comprising:
   a service vehicle, including:
      a first lift device configured to dispose of waste material contained in the service vehicle at a disposal site, the first lift device including one or more lift arms and one or more actuators; and
      at least one sensor comprising one of a load cell, a force gauge, a pressure sensor, a motion sensor, and a camera and configured to generate a service signal indicative of an onloading service being performed; and
   an identity detection device configured to generate an identity signal associated with the service vehicle at the disposal site;
   a scale configured to generate a weight signal indicative of an amount of waste material disposed of by the service vehicle at the disposal site during the offloading service; and
   at least one processor in communication with the identity detection device and the scale, the at least one processor being configured to:
      monitor a location of the service vehicle using a locating device;
      determine a first waste material type based on determining a first location of the service vehicle, the first location corresponding with a service site and the first waste material type;
      correlate the weight signal to a customer for which the service vehicle previously performed the onloading service based on the identity signal and based on the service signal from the at least one sensor;
      determine a price based on the weight signal, the first waste material type, and the identity signal; and
      automatically generate an invoice including the determined price for the customer for the onloading service and for the offloading service.

2. The system of claim 1, wherein the identity detection device is a license plate reader configured to capture an image of a license plate on the service vehicle.

3. The system of claim 2, wherein the at least one processor is configured to compare the image to images of known license plates stored in memory to determine an identity of the service vehicle.

4. The system of claim 1, wherein the locating device is configured to generate a location signal indicative of a location of the service vehicle during the onloading service and wherein the at least one processor is further configured to correlate the weight signal to the customer based on the location signal.

5. The system of claim 1, wherein:
   the service vehicle is configured to perform the onloading service for a plurality of customers prior to performing the offloading service at the disposal site; and
   the at least one processor is further configured to correlate a portion of the weight signal to each of the plurality of customers based on the service signal generated during each onloading service.

6. The system of claim 5, wherein the at least one processor is further configured to correlate a portion of the weight signal to each of the plurality of customers based on the first waste material type collected during each onloading service.

7. The system of claim 6, further comprising an input device configured to receive the type of waste as input from an operator of the service vehicle.

8. The system of claim 1, wherein the weight signal is indicative of a net weight change experienced by the service vehicle at the disposal site during offloading.

9. The system of claim 1, wherein the identity detection device is configured to generate the identity signal at entry of the service vehicle to the disposal site.

10. The system of claim 1, wherein the at least one processor is further configured to automatically generate payment to the disposal site based on the identity signal and the weight signal.

11. The system of claim 10, wherein the at least one processor is further configured to automatically generate payment to a service provider responsible for the service vehicle based on the identity signal, the weight signal, and correlating of the weight signal to the customer.

12. The system of claim 11, wherein the at least one processor is further configured to automatically update an account, record of at least one of the customer and the service provider based on the identity signal, the weight signal, and correlating of the weight signal to the customer.

13. The system of claim 1, wherein the at least one processor forms a portion of a least one of an onboard controller, a disposal site controller, and a remote server in communication with the onboard controller and the disposal site controller.

14. A method for managing an offloading service, the method comprising:
   generating, by a service vehicle including a first lift device configured to dispose of waste material contained in the service vehicle at a disposal site, the first lift device including one or more lift arms and one or more actuators, a service signal indicative of an onloading service being performed, the service signal generated by at least one sensor comprising one of a load cell, a force gauge, a pressure sensor, a motion sensor, and a camera;

generating an identity signal using an identity detection device associated with the service vehicle at the disposal site;

monitoring using a processor in communication with the identity detection device and a scale, a location of the service vehicle using a locating device;

determining a first waste material type based on determining a first location of the service vehicle, the first location corresponding with a service site and the first waste material type; disposing of the waste material by activating the first lift device of the service vehicle generating a weight signal using the scale indicative of an amount of the waste material disposed of by the service vehicle at the disposal site during the offloading service;

correlating the weight signal to a customer for which the service vehicle previously performed the onloading service based on the identity signal and based on the service signal;

determining a price based on the weight signal, the first waste material type, and the identity signal; and automatically generating an invoice including the determined price for the customer for the onloading service and for the offloading service.

15. The method of claim 14, further comprising:

generating a location signal indicative of a location of the service vehicle during the onloading service;

wherein correlating the weight signal to the customer further includes correlating the weight signal to the customer based on the location signal.

16. The method of claim 15, further comprising:

automatically generating payment to the disposal site based on the identity signal and the weight signal;

automatically generating payment to a service provider responsible for the service vehicle based on the identity signal, the weight signal, and correlating of the weight signal to the customer; and automatically updating an account record of at least one of the customer and the service provider based on the identity signal, the weight signal, the service signal, the location signal, and correlating of the weight signal to the customer.

17. A non-transitory computer readable medium containing computer-executable programming instructions for performing a method of managing an offloading service, the method comprising:

generating, by a service vehicle including a first lift device configured to dispose of waste material contained in the service vehicle at a disposal site, the first lift device including one or more lift arms and one or more actuators, a service signal indicative of an onloading service performed by the service vehicle, the service signal being generated by at least one sensor comprising one of a load cell, a force gauge, a pressure sensor, a motion sensor, and a camera;

monitoring using a processor in communication with an identity detection device and a scale, a location of the service vehicle using a locating device;

determining a first waste material type based on determining a first location of the service vehicle, the first location corresponding with a waste material site and the first waste material type;

generating an identity signal using the identity detection device associated with the service vehicle at the disposal site;

generating a location signal indicative of a location of the service vehicle during the onloading service; activating the first lift device of the service vehicle to dispose of the waste material generating a weight signal using the scale indicative of an amount of waste material disposed of by the service vehicle at the disposal site during the offloading service;

correlating the weight signal to a customer for which the service vehicle performed the onloading service based on the identity signal, the service signal, and the location signal;

determining a price based on the weight signal, the first waste material type, and the identity signal;

automatically generating an invoice including the determined price for the customer for the onloading service and for the offloading service;

automatically generating payment to the disposal site based on the identity signal and the weight signal;

automatically generating payment to a service provider responsible for the service vehicle based on the determined price; and automatically updating an account record of at least, one of the customer and the service provider based on the determined price, the identity signal, the weight signal, the service signal, the location signal, and correlating of the weight signal to the customer.

18. The non-transitory computer readable medium of claim 17, the method further comprising performing by the service vehicle the onloading service for a plurality of customers prior to performing the offloading service at the disposal site; and correlating by the processor a portion of the weight signal to each of the plurality of customers based on the service signal generated during each onloading service.

19. The non-transitory computer readable medium of claim 17, the method further comprising capturing an image of a license plate on the service vehicle and comparing the image to images of known license plates stored in memory to determine an identity of the service vehicle.

20. The non-transitory computer readable medium of claim 17, wherein the weight signal is indicative of a net weight change experienced by the service vehicle at the disposal site during offloading.

* * * * *